Dec. 31, 1963    J. W. BARNSTEAD    3,115,987
WELDED CONTAINER WITH THERMOPLASTIC LINING
AND METHOD OF MAKING SAME
Filed Oct. 5, 1962

INVENTOR.
JOHN W. BARNSTEAD

BY *Richard L. Caslin*

HIS ATTORNEY 3,115,987
WELDED CONTAINER WITH THERMOPLASTIC LINING AND METHOD OF MAKING SAME
John W. Barnstead, Anchorage, Ky., assignor to General Electric Company, a corporation of New York
Filed Oct. 5, 1962, Ser. No. 228,553
4 Claims. (Cl. 220—64)

The present invention relates to the design of a welded joint between two thermoplastic coated metal plates so as to form a continuous corrosion resistant inner liner for the plates.

With the advent of improved plastic materials there has been an increase in the number of applications of plastic linings on the inside of containers to provide a corrosion resistant finish. The use of such a plastic liner creates a problem in the method of welding the pre-coated metal plates together so as to prevent the formation of pin holes in the plastic in the vicinity of the welded joint, especially for joints having inner surfaces which are non-accessible.

The principal object of the present invention is to provide a welded joint between two thermoplastic coated metal plates so as to cause the fusing of the plastic while preventing injury to the thermoplastic in the vicinity of the welded joint.

A further object of the present invention is to provide a welded joint between two thermoplastic coated metal plates having relief means for preventing trapped air and generated gases from puncturing the thermoplastic liner.

The present invention, in accordance with one form thereof, is embodied in a welded joint between two metal plates. The inner surface of each plate is first lined with a thin layer of thermoplastic material except in a portion of the area of the edges where the plates are to overlap each other and are to be welded together. The welding operation will fuse the metal plates together and the heat generated during welding will be conducted to the thermoplastic material to heat seal it together and form a corrosion resistant plastic joint for the plates. Relief means in the form of vent holes are formed adjacent the welded joint to allow the escape of trapped air and generated gases so as to prevent the gases from puncturing the thermoplastic liner.

My invention will be better understood from the following description taken in conjunction with the accompanying drawing and its scope will be pointed out in the appended claims.

Figure 1:
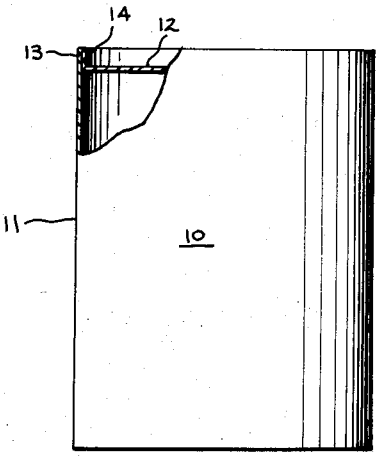
FIGURE 1 is a front elevational view of a welded container embodying the present invention with parts broken away to show the welded joint between the shell of the container and an end cap.

Turning now to a detailed description of the drawing and in particular to FIGURE 1, there is shown a tank or container 10 that has a cylindrical shell 11 that is open at both top and bottom ends where at least the top end is closed by an end cap 12. The periphery of the end cap 12 is provided with a flange portion 14 that is adapted to fit closely within the upper edge 13 of the shell for welding thereto.

Figure 2:
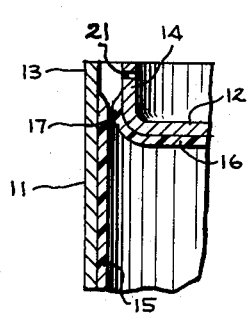
FIGURE 2 is a fragmentary detail view of the welded joint prior to the welding operation with the end cap separated from the shell so as to best understand the nature of the two thermoplastic coated metal plates.

Looking at the enlarged view of FIGURE 2 it is clear that each metal plate 11 and 12 is provided with an inner coating 15 and 16 respectively of thermoplastic material such as a plastisol or polyvinyl chloride or the like. A portion of the inner surface of each of the two plates is not coated, and this uncoated portion is in the vicinity of the welded joint at the outermost edge of the portions 13 and 14. It is to be understood that there is a close tight-fitting relationship between the end cap 12 and the shell 11, and that FIGURE 2 has been exaggerated by moving the end cap 12 away from the shell so as to best understand the nature of the two elements. Attention is directed to the double thickness of thermoplastic material at 17 that would be under compression when the cap 12 is forced into the shell.

Figure 3:
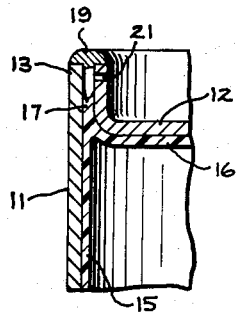
FIGURE 3 is a fragmentary view similar to that of FIGURE 2 after the welding operation has been performed.

Now turning to the finished view of FIGURE 3, the end cap 12 has been welded to the shell 11 by a continuous bead of welding material 19 which is shown as being spaced from the area of double thickness of thermoplastic material 17. The principle here is to separate the weld 19 by a distance from the double thickness 17 of thermoplastic layers under compression so that when the temperature of the two metal sheets is raised by the heat of the welding operation, heat will be conducted through the metal with a proper temperature gradient so that the temperature of the thermoplastic rises to a melting point where the double layers of plastic are sealed together as shown. Care must be taken that this distance is not so small that the temperature to which the plastic is exposed becomes excessive to a point of degrading the plastic where the plastic ingredients would interfere with the welding operation. Moreover, this distance must not be too large so that the plastic would not soften and flow together.

Relief means must be provided to carry off any trapped air or generated gases that form within the welded joint. This relief means is depicted as vent holes 21 which are formed in the flange 14 of the end cap 12. These vent holes 21 are located between the welding material 19 and the heat sealed thermoplastic joint 17. The number, size and placement of the vent holes depends on the particular design and is not of critical import. In a low pressure container the welded bead 19 could be discontinuous or the method could use spot welding techniques instead of seam welding as shown. Also, in high pressure vessels the vent holes in one of the plates could be tapped holes so threaded plus could close off the vent holes after the completion of the welding operation.

Modifications of this invention will occur to those skilled in this art, therefore, it is to be understood, that this invention is not limited to the particular embodiments disclosed but that it is intended to cover all modifications which are within the true spirit and scope of this invention as claimed.

What I claim as new and desire to secure by Letters Patent of the United States is:

1. A method of making a leak-proof welded joint between two thermoplastic coated metal plates comprising the steps of coating the inner surfaces of each metal plate with a layer of thermoplastic material except in a portion of the area of the edges where the plates are to overlap each other and are to be welded together, the step of providing vent holes in at least one of the plates, the holes being located in the uncoated area between a double thickness of the thermoplastic inner lining and the edges of the plates that are to be welded together, whereby the welding operation will fuse the metal plates together and some of the heat generated during the welding operation will be conducted to the thermoplastic and heat seal it so as to form a continuous corrosion resistant inner lining on the plates, the vent holes serving to relieve the welded joint from trapped air and generated gases so as to prevent the gases from puncturing the thermoplastic joint.

2. A welded joint for connection of two thermoplastic coated metal plates, the inner surface of each metal plate being coated with a thermoplastic material except in a portion of the area of the edges where the plates overlap each other and are to be welded together, vent holes provided in the uncoated area of at least one of the plates, the holes being located between a double thickness of the thermoplastic inner lining and the welded ends of the plates, whereby the heat generated by the welding operation serves to fuse the double thickness of thermoplastic material so as to form a continuous corrosion resistant inner lining for the plates, the vent holes serving to relieve the welded joint from trapped air and generated gases so as to prevent the gases from puncturing the thermoplastic liner.

3. A container comprising a metal shell and an end cap welded to at least one end of the shell, the inner surface of the shell and the end cap each being coated with a layer of thermoplastic material except in the outermost portion of the area where the shell and end cap overlap each other and are welded together, the heat of the welding operation serving to heat seal the thermoplastic material in the vicinity of the welded joint to form a continuous corrosion resistant thermoplastic inner liner for the container, at least one of the shell member and end cap member having vent holes located between the welded joint and the fused thermoplastic portion, the vent holes serving to relieve the welded joint from trapped air and generated gases so as to prevent the gases from puncturing the thermoplastic liner.

4. A welded joint for connection of two metal plates, each plate having an inner lining of thermoplastic material except along the edges of the plates where the welds are to be applied, portions of the plastic coated portions of the two plates being held under compression with each other so that when the welding operation is performed the heat generated due to the welding will serve to heat seal the plastic layers under compression to form a continuous corrosion-resistant lining for the plates, and venting means adjacent the welded area to allow the escape of generated gases without puncturing the plastic seal.

References Cited in the file of this patent

UNITED STATES PATENTS

| | | |
|---|---|---|
| 2,348,696 | Schabacker | May 9, 1944 |
| 2,412,528 | Morrell | Dec. 10, 1946 |
| 2,941,064 | Gieser et al. | June 14, 1960 |